US009279377B2

(12) United States Patent
Genko

(10) Patent No.: US 9,279,377 B2
(45) Date of Patent: Mar. 8, 2016

(54) AIR-FUEL RATIO IMBALANCE DETERMINATION APPARATUS AND AIR-FUEL RATIO IMBALANCE DETERMINATION METHOD

(71) Applicant: Takeshi Genko, Toyota (JP)

(72) Inventor: Takeshi Genko, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 442 days.

(21) Appl. No.: 13/754,227

(22) Filed: Jan. 30, 2013

(65) Prior Publication Data

US 2013/0197782 A1 Aug. 1, 2013

(30) Foreign Application Priority Data

Feb. 1, 2012 (JP) ................................. 2012-020065

(51) Int. Cl.
*B60T 7/12* (2006.01)
*F02D 41/00* (2006.01)
(Continued)

(52) U.S. Cl.
CPC ........ *F02D 41/0085* (2013.01); *F02D 41/1441* (2013.01); *F02D 41/1454* (2013.01); *F02D 41/1456* (2013.01); *F02D 41/2448* (2013.01); *F02D 41/2454* (2013.01); *F02D 41/1488* (2013.01)

(58) Field of Classification Search
CPC ............ F02D 41/0082; F02D 41/0085; F02D 41/0087; F02D 41/1498; F02D 41/1441; F02D 41/1456; F02D 41/2454; F02D 41/1454; F02D 2041/1409; F02D 41/0295; F02D 41/1495; F02D 2041/1422
USPC .......... 701/103–107, 110–111; 123/435, 436, 123/406.24, 406.58, 672–675, 690–692, 123/339.12–339.15; 73/35.09, 114.03, 73/114.04, 114.07, 114.25–114.27, 73/114.02, 114.25–114.272
See application file for complete search history.

(56) References Cited

U.S. PATENT DOCUMENTS

| | | | | | |
|---|---|---|---|---|---|
| 4,788,958 | A * | 12/1988 | Nakajima ........... | F02D 41/2454 123/674 |
| 4,926,827 | A * | 5/1990 | Kato .................. | F02D 41/1441 123/488 |

(Continued)

FOREIGN PATENT DOCUMENTS

| | | | |
|---|---|---|---|
| JP | 11-030141 | A | 2/1999 |
| JP | 2005133714 | A | 5/2005 |

(Continued)

*Primary Examiner* — Stephen K Cronin
*Assistant Examiner* — Brian Kirby
(74) *Attorney, Agent, or Firm* — Dinsmore & Shohl LLP

(57) ABSTRACT

An air-fuel ratio imbalance determination apparatus for a multi-cylinder internal combustion engine includes an air-fuel ratio sensor with a catalyst layer disposed in an exhaust passage of the multi-cylinder internal combustion engine; and a control unit configured: to perform determination regarding an air-fuel ratio imbalance state among cylinders of the multi-cylinder internal combustion engine based on an amount of change per unit time in an air-fuel ratio detected by the air-fuel ratio sensor; to execute an air-fuel ratio enrichment control using an air-fuel ratio enrichment amount; and to correct a learned imbalance value when the air-fuel ratio enrichment amount is smaller than a predetermined determination threshold value in a case where an engine operation state is in an imbalance learning range during execution of the air-fuel ratio enrichment control.

6 Claims, 10 Drawing Sheets

(51) Int. Cl.

| | |
|---|---|
| ***F02D 41/14*** | (2006.01) |
| ***F02D 41/24*** | (2006.01) |

(56) References Cited

U.S. PATENT DOCUMENTS

| | | | | |
|---|---|---|---|---|
| 8,176,728 | B2 * | 5/2012 | Ootake | F01N 3/2006 60/284 |
| 2002/0104520 | A1 * | 8/2002 | Nakasaka | F01L 1/053 123/673 |
| 2002/0112467 | A1 * | 8/2002 | Uranishi | F01N 11/007 60/277 |
| 2005/0056266 | A1 * | 3/2005 | Ikemoto | F02D 41/1495 123/688 |
| 2005/0075781 | A1 | 4/2005 | Mizuno et al. | |
| 2008/0114526 | A1 * | 5/2008 | Nozawa | F02D 41/22 701/103 |
| 2011/0054761 | A1 * | 3/2011 | Sawada | F02D 41/0085 701/103 |
| 2011/0174282 | A1 | 7/2011 | Maruyama et al. | |
| 2011/0295491 | A1 * | 12/2011 | Kurahashi | F02D 41/0085 701/103 |
| 2012/0024272 | A1 * | 2/2012 | Iwazaki | F02D 41/0085 123/703 |
| 2012/0024273 | A1 * | 2/2012 | Iwazaki | F02D 41/0085 123/703 |
| 2012/0035831 | A1 | 2/2012 | Kidokoro et al. | |
| 2012/0160022 | A1 * | 6/2012 | Kimura | F02B 75/041 73/114.72 |
| 2012/0173115 | A1 * | 7/2012 | Sawada | F02D 41/0085 701/101 |
| 2012/0209497 | A1 * | 8/2012 | Yoshikawa | F02D 41/0085 701/103 |
| 2012/0277980 | A1 * | 11/2012 | Iwazaki | F02D 41/0085 701/104 |
| 2014/0137404 | A1 * | 5/2014 | Kawai | G01N 27/4075 29/885 |

FOREIGN PATENT DOCUMENTS

| | | | |
|---|---|---|---|
| JP | 2009-075012 | A | 4/2009 |
| JP | 2011-144785 | A | 7/2011 |
| JP | 2012-017657 | A | 1/2012 |
| WO | 2010064331 | A1 | 6/2010 |
| WO | 2011001539 | A1 | 1/2011 |
| WO | WO 2011001539 | A1 * | 1/2011 |

* cited by examiner

AIR-FUEL RATIO IMBALANCE DETERMINATION APPARATUS AND AIR-FUEL RATIO IMBALANCE DETERMINATION METHOD

INCORPORATION BY REFERENCE

The disclosure of Japanese Patent Application No. 2012-020065 filed on Feb. 1, 2012 including the specification, drawings and abstract is incorporated herein by reference in its entirety.

BACKGROUND OF THE INVENTION

1. Field of the Invention

The invention relates to an air-fuel ratio imbalance determination apparatus and an air-fuel ratio imbalance determination method that determine an inter-cylinder air-fuel ratio imbalance state in a multi-cylinder internal combustion engine.

2. Description of Related Art

In an exhaust system of an internal combustion engine (hereinafter also referred to as an engine) mounted on a vehicle or the like, a catalyst for purifying exhaust gas (e.g., a three-way catalyst) is provided. The catalyst is capable of purifying (converting) exhaust gas components most efficiently when an air-fuel ratio of exhaust gas flowing into the catalyst falls within a predetermined range. Accordingly, an air-fuel ratio sensor is disposed in an exhaust passage at a position upstream of the catalyst, and the amount of fuel injected from an injector is controlled through feedback based on a deviation between the air-fuel ratio detected by the air-fuel ratio sensor (the air-fuel ratio of the exhaust gas flowing into the catalyst) and a target air-fuel ratio (e.g., a stoichiometric air-fuel ratio) (main feedback control (main F/B control)). By executing the air-fuel ratio feedback control described above, it is possible to control the air-fuel ratio with high accuracy and achieve an improvement in exhaust gas emission.

In addition, what is called a sub feedback control (sub F/B control) is generally executed. In the sub feedback control, the air-fuel ratio of the exhaust gas having passed through the catalyst is detected based on the output value of an $O_2$ sensor (oxygen sensor) provided downstream of the catalyst, and the output of the above air-fuel ratio sensor is corrected.

In a multi-cylinder internal combustion engine including a plurality of cylinders, there are cases where an actual air-fuel ratio varies among the cylinders (an air-fuel ratio imbalance) resulting from a variation in the injection performance of injectors provided in the individual cylinders or a variation in intake air distribution amount among the cylinders and, when the above situation occurs, there are cases where an emission is deteriorated due to a deterioration of combustion of a specific cylinder.

To cope with this, there is adopted a method in which the inter-cylinder air-fuel ratio imbalance is suppressed by determining whether or not the air-fuel ratio imbalance state occurs based on an output signal of the air-fuel ratio sensor and correcting the fuel injection amount in a case where the air-fuel ratio imbalance state occurs (see, e.g., Japanese Patent Application Publication No. 2005-133714 (JP-2005-133714 A)). An example of a method for determining the air-fuel ratio imbalance state includes a method in which an amount of change per unit time in the air-fuel ratio detected by the air-fuel ratio sensor (hereinafter also referred to as an air-fuel ratio gradient) is detected, and it is determined that the air-fuel ratio imbalance state occurs when the air-fuel ratio gradient (an absolute value) is larger than an imbalance determination threshold value (see, e.g., Japanese Patent Application Publication No. 2011-144785 (JP-2011-144785 A)).

In the air-fuel ratio sensor disposed in the exhaust passage of the engine, the sensor output (the detected air-fuel ratio) may be a value richer than the actual air-fuel ratio due to selective diffusion of $H_2$ in the exhaust gas. As an air-fuel ratio sensor capable of preventing this rich output, there is an air-fuel ratio sensor having a catalyst layer provided in a sensor element (hereinafter also referred to as an air-fuel ratio sensor with a catalyst layer) (see, e.g., Japanese Patent Application Publication No. 2009-075012 (JP-2009-075012 A) and WO 2010/064331).

In the air-fuel ratio sensor with the catalyst layer, it is possible to enhance the accuracy of detection of the air-fuel ratio by oxidizing (purifying) $H_2$ contained in the exhaust gas in the catalyst layer. However, an exhaust gas component reaches the exhaust side of the sensor after being reacted and diffused in the catalyst layer, and hence the response of the sensor output is delayed. When such a response delay is caused, the above air-fuel ratio gradient used for the determination regarding the air-fuel ratio imbalance state is reduced. In order to prevent the response delay, the target air-fuel ratio is set to be rich (an air-fuel ratio enrichment control is performed), the response delay due to the catalyst layer is thereby eliminated, and the above air-fuel ratio gradient is thereby increased. However, in a case where the degree of richness provided by the air-fuel ratio enrichment control is insufficient, an estimated imbalance ratio estimated from the above air-fuel gradient (a learned imbalance value) becomes smaller than the actual imbalance ratio.

SUMMARY OF THE INVENTION

The invention provides an air-fuel ratio imbalance determination apparatus and an air-fuel ratio imbalance determination method that accurately perform determination regarding an air-fuel ratio imbalance state based on an air-fuel ratio gradient in a multi-cylinder internal combustion engine including an air-fuel ratio sensor with a catalyst layer disposed in an exhaust passage.

A first aspect of the invention relates to an air-fuel ratio imbalance determination apparatus for a multi-cylinder internal combustion engine. The air-fuel ratio imbalance determination apparatus includes an air-fuel ratio sensor with a catalyst layer disposed in an exhaust passage of the multi-cylinder internal combustion engine; and a control unit configured: to perform determination regarding an air-fuel ratio imbalance state among cylinders of the multi-cylinder internal combustion engine based on an amount of change per unit time in an air-fuel ratio detected by the air-fuel ratio sensor (an air-fuel ratio gradient); to execute an air-fuel ratio enrichment control using an air-fuel ratio enrichment amount; and to correct a learned imbalance value when the air-fuel ratio enrichment amount is smaller than a predetermined determination threshold value in a case where an engine operation state is in an imbalance learning range during execution of the air-fuel ratio enrichment control. In the above-aspect of the invention, the control unit may be configured to execute the air-fuel ratio enrichment control in a case where the control unit determines that the air-fuel ratio imbalance state occurs.

The imbalance learning range mentioned herein is an engine operation range in which the imbalance state is to be determined, and is set in advance by means of a test, calculation, or the like in consideration of a range where an emission is good, running modes (regulations), and a range where operation frequency is high.

According to the above aspect of the invention, in the case where the engine operation state is in the imbalance learning range during the execution of the air-fuel ratio enrichment control, the learned imbalance value is corrected (a correction that increases the learned value is performed) when the air-fuel ratio enrichment amount is small. Therefore, it is possible to improve the accuracy of the imbalance learning. With this, it is possible to perform the determination regarding the air-fuel ratio imbalance state based on the air-fuel ratio gradient, with improved accuracy.

The air-fuel ratio imbalance determination apparatus according to the above aspect of the invention may further include an oxygen sensor that is disposed downstream of the air-fuel ratio sensor with respect to an exhaust gas flow, and the control unit may be configured to execute an air-fuel ratio sub feedback control based on an output of the oxygen sensor, and to execute the air-fuel ratio sub feedback control in a case where the output of the oxygen sensor is a lean output during the execution of the air-fuel ratio enrichment control. With the above control, it is possible to cause an atmosphere in a catalyst in the exhaust passage to correspond to the stoichiometric air-fuel ratio, and hence it is possible to suppress the emission of NOx. In addition, in this case, a correction amount of the sub feedback control may also be learned.

A second aspect of the invention relates to an air-fuel ratio imbalance determination method for a multi-cylinder internal combustion engine including an air-fuel ratio sensor with a catalyst layer disposed in an exhaust passage of the multi-cylinder internal combustion engine. In the air-fuel ratio imbalance determination method, determination regarding an air-fuel ratio imbalance state among cylinders of the multi-cylinder internal combustion engine is performed based on an amount of change per unit time in an air-fuel ratio detected by the air-fuel ratio sensor, and an air-fuel ratio enrichment control is executed using an air-fuel ratio enrichment amount. The air-fuel ratio imbalance determination method includes determining whether an engine operation state is in an imbalance learning range during execution of the air-fuel ratio enrichment control; determining whether the air-fuel ratio enrichment amount is smaller than a predetermined determination threshold value in a case where it is determined that the engine operation state is in the imbalance learning range; and correcting the learned imbalance value in a case where it is determined that the air-fuel ratio enrichment amount is smaller than the predetermined determination threshold value.

According to the above aspects of the invention, in the multi-cylinder internal combustion engine including the air-fuel ratio sensor with the catalyst layer disposed in the exhaust passage, it is possible to accurately perform the determination regarding the air-fuel ratio imbalance state based on the amount of change in the air-fuel ratio detected by the air-fuel ratio sensor (the air-fuel ratio gradient).

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5 is a block diagram showing a structure of a control system such as an electronic control unit (ECU) or the like;

DETAILED DESCRIPTION OF EMBODIMENTS

Hereinbelow, an embodiment of the invention will be described on the basis of the drawings.

(Engine)

Figure 1:
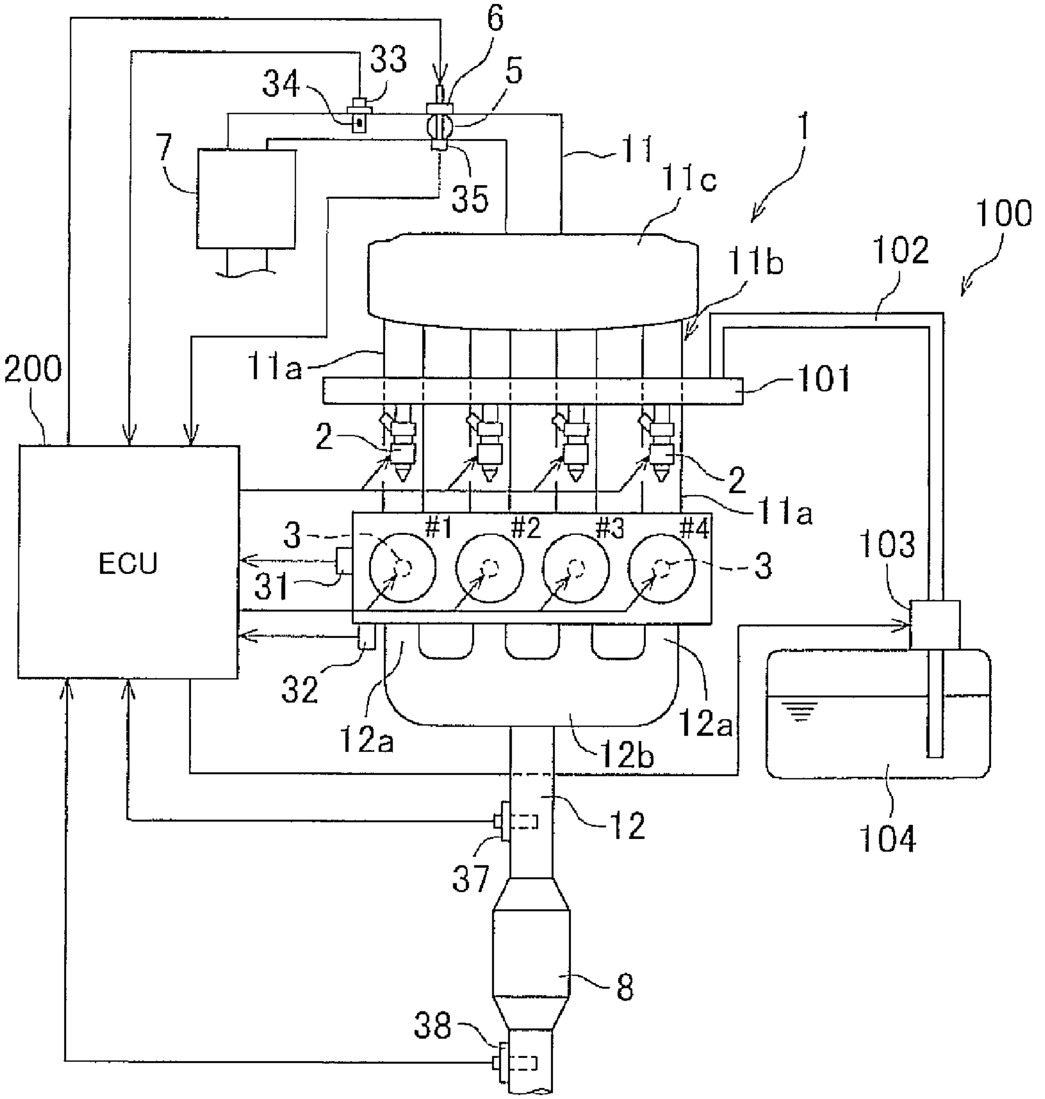
FIG. 1 is a schematic structural view showing an example of a multi-cylinder engine to which the invention is applied.
Figure 2:
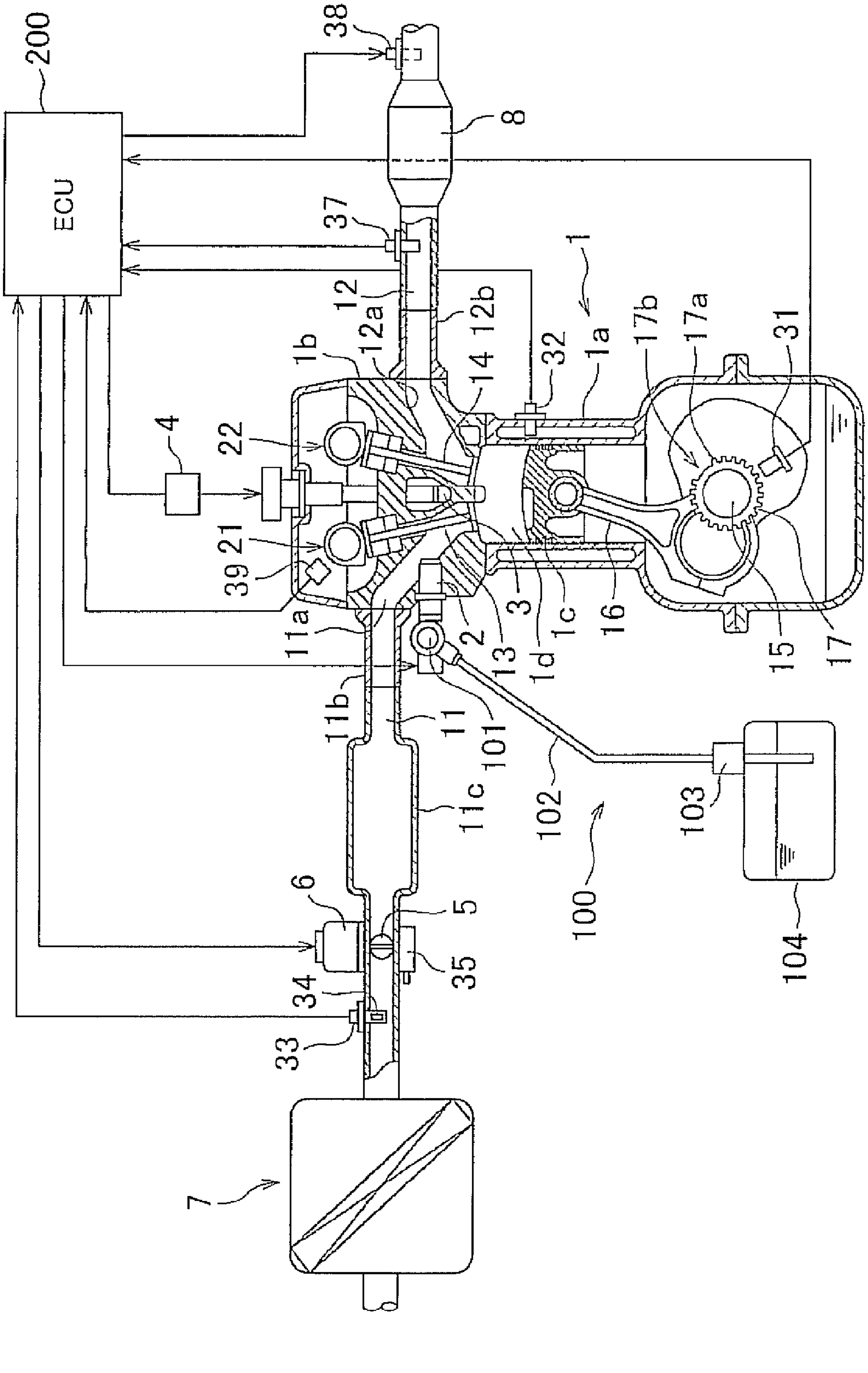
FIG. 2 is a schematic structural view showing only one cylinder of the engine of FIG. 1.

Each of FIGS. 1 and 2 is a view showing a schematic structure of a multi-cylinder engine to which the invention is applied. Note that FIG. 2 shows the structure of only one cylinder of an engine 1. The engine 1 of this example can be applied to both of a conventional vehicle on which only the engine is mounted as a driving force source and a hybrid vehicle (HV vehicle) on which the engine and a motor (a motor generator or a motor) are mounted as the driving force sources.

An engine 1 in this example is a port-injection four-cylinder engine (a spark-ignition internal combustion engine) mounted on a vehicle and, in a cylinder block 1*a* including cylinders #1, #2, #3, and #4 of the engine 1, there is provided a piston 1*c* that reciprocates in each cylinder in a top-bottom direction. The piston 1*c* is coupled to a crankshaft 15 via a connecting rod 16, and the reciprocation of the piston 1*c* is converted to the rotation of the crankshaft 15 by the connecting rod 16.

A signal rotor 17 is attached to the crankshaft 15. A plurality of teeth (protrusions) 17*a* are provided on the outer peripheral surface of the signal rotor 17 at regular angular intervals (e.g., 10° CA (crank angle) in this example). In addition, the signal rotor 17 has a no-tooth portion 17*b* that lacks two teeth 17*a*.

In the vicinity of the side of the signal rotor 17, a crank position sensor 31 that detects a crank angle is disposed. The crank position sensor 31 is, e.g., an electromagnetic pickup, and generates a pulsed signal (a voltage pulse) corresponding to the tooth 17*a* of the signal rotor 17 when the crankshaft 15 rotates. It is possible to calculate an engine rotational speed from the output signal of the crank position sensor 31.

In the cylinder block 1*a* of the engine 1, a coolant temperature sensor 32 that detects the temperature of engine coolant is disposed. In addition, a cylinder head 1*b* is provided at the upper end of the cylinder block 1*a*, and a combustion chamber 1*d* is provided between the cylinder head 1*b* and the piston 1*c*. A spark plug 3 is disposed in the combustion chamber 1*d* of the engine 1. The ignition timing of the spark plug 3 is adjusted by an igniter 4. The igniter 4 is controlled by an ECU 200.

To the combustion chamber 1*d* of the engine 1, an intake passage 11 and an exhaust passage 12 are connected. A part of the intake passage 11 is formed of an intake port 11*a* and an intake manifold 11*b*. A surge tank 11*c* is provided in the intake passage 11. In addition, a part of the exhaust passage 12 is formed of an exhaust port 12*a* and an exhaust manifold 12*b*.

In the intake passage 11 of the engine 1, there are disposed an air cleaner 7 that filters intake air, a hot-wire air flow meter 33, an intake air temperature sensor 34 (provided in the air flow meter 33), and a throttle valve 5 for adjusting the intake air amount of the engine 1. The throttle valve 5 is provided upstream of the surge tank 11*c* (upstream of the surge tank 11*c* with respect to an intake air flow) and is driven by a throttle motor 6. The opening of the throttle valve 5 is detected by a throttle opening sensor 35. The opening of the throttle valve 5 is controlled by the ECU 200.

A three-way catalyst 8 is disposed in the exhaust passage 12 of the engine 1. The three-way catalyst 8 has an $O_2$ storage function (an oxygen storage function) of storing (occluding) oxygen, and is capable of purifying HC, CO, and NOx with the oxygen storage function even when the air-fuel ratio is deviated from a stoichiometric air-fuel ratio to some extent. That is, when the air-fuel ratio of the engine 1 becomes lean and oxygen and NOx in the exhaust gas flowing into the three-way catalyst 8 are increased, the three-way catalyst 8 stores part of oxygen, and the reduction and purification (conversion) of NOx are thereby facilitated. On the other hand, when the air-fuel ratio of the engine 1 becomes rich and a large amount of HC and CO is contained in the exhaust gas flowing into the three-way catalyst 8, the three-way catalyst 8 releases oxygen molecules stored inside the three-way-catalyst 8 to give the oxygen molecules to HC and CO, and the oxidation and purification of HC and CO are thereby facilitated.

A front air-fuel ratio sensor 37 is disposed in the exhaust passage 12 at a position upstream of the three-way catalyst 8 (upstream of the three-way catalyst 8 with respect to an exhaust gas flow), and a rear $O_2$ sensor 38 is disposed in the exhaust passage 12 at a position downstream of the three-way catalyst 8.

Figure 3:
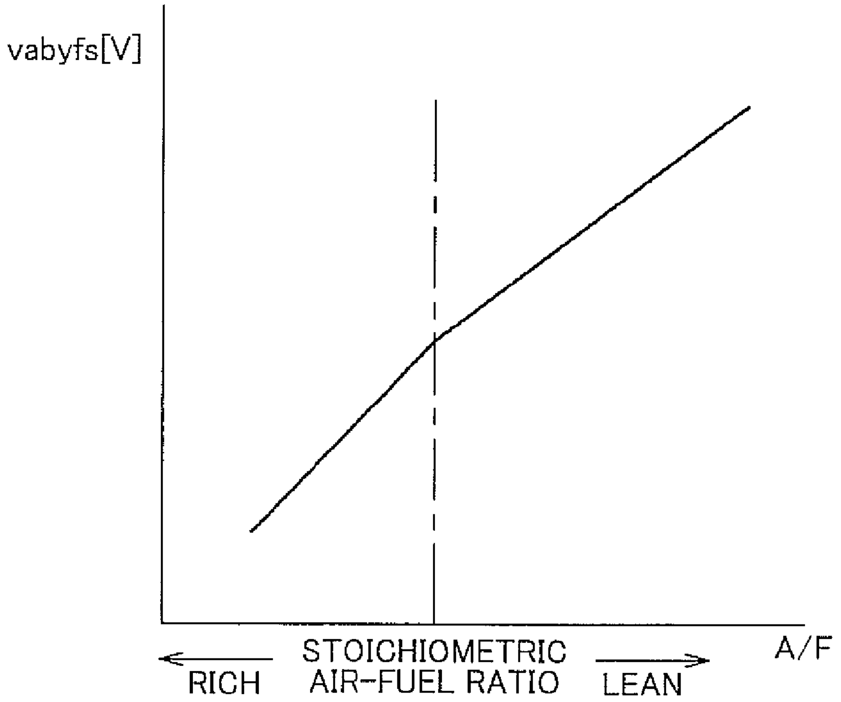
FIG. 3 is a view showing a relationship between an output voltage of a front air-fuel ratio sensor and an air-fuel ratio.

As the front air-fuel ratio sensor 37, for example, a limiting current oxygen concentration sensor is used, and the front air-fuel ratio sensor 37 is capable of continuously detecting the air-fuel ratio in a wide air-fuel ratio range. FIG. 3 shows an output characteristic of the front air-fuel ratio sensor 37. As shown in FIG. 3, the front air-fuel ratio sensor 37 outputs a voltage signal vabyfs proportional to the detected air-fuel ratio (a pre-catalyst exhaust gas air-fuel ratio). In addition, the gradient of the characteristic (an air-fuel ratio–voltage characteristic) of the front air-fuel ratio sensor 37 changes at a stoichiometric air-fuel ratio. The front air-fuel ratio sensor 37 used in the embodiment is an air-fuel ratio sensor with a catalyst layer in which the catalyst layer is provided in a sensor element (see, e.g., Pamphlet of WO 2010/064331A1).

Figure 4:
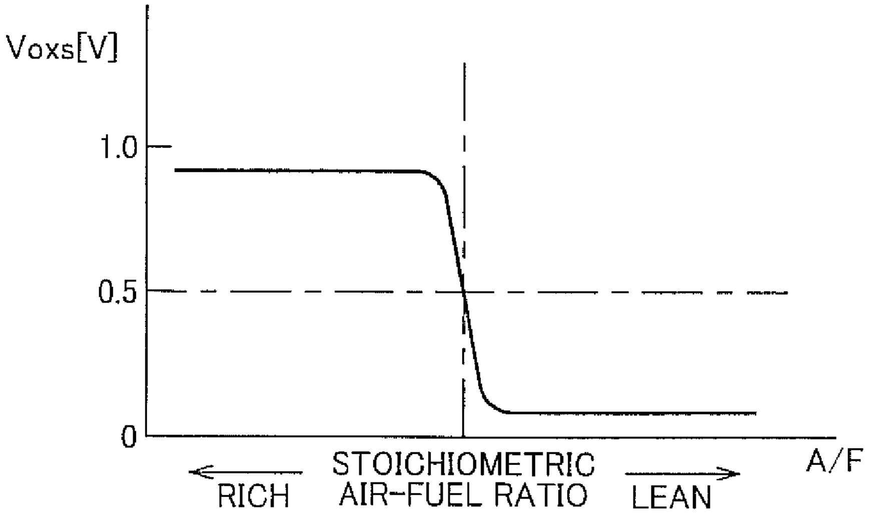
FIG. 4 is a view showing a relationship between an output voltage of a rear $O_2$ sensor and an air-fuel ratio.

The rear $O_2$ sensor 38 is a sensor that displays a characteristic (Z characteristic) in which the output value changes stepwise in the vicinity of the stoichiometric air-fuel ratio. In this example, as the rear $O_2$ sensor 38, for example, an electromotive force (concentration cell) type oxygen concentration sensor is used. FIG. 4 shows an output characteristic of the rear $O_2$ sensor 38. As shown in FIG. 4, the rear $O_2$ sensor 38 outputs a voltage Voxs that sharply changes at the stoichiometric air-fuel ratio. More specifically, the rear $O_2$ sensor 38 is configured to output a voltage of, e.g., about 0.1 (V) when the air-fuel ratio is leaner than the stoichiometric air-fuel ratio, output a voltage of about 0.9 (V) when the air-fuel ratio is richer than the stoichiometric ratio, and output a voltage of about 0.5 (V) when the air-fuel ratio corresponds to the stoichiometric air-fuel ratio.

The respective output signals of the front air-fuel ratio sensor 37 and the rear $O_2$ sensor 38 are input to the ECU 200.

An intake valve 13 is provided between the intake passage 11 and the combustion chamber 1*d*, and communication between the intake passage 11 and the combustion chamber 1*d* is allowed or interrupted by opening or closing the intake valve 13. In addition, an exhaust valve 14 is provided between the exhaust passage 12 and the combustion chamber 1*d*, and communication between the exhaust passage 12 and the combustion chamber 1*d* is allowed or interrupted by opening or closing the exhaust valve 14. The intake valve 13 and the exhaust valve 14 are opened and closed by the rotation of an intake camshaft 21 and an exhaust camshaft 22 to which the rotation of the crankshaft 15 is transmitted via a timing chain or the like.

In the vicinity of the intake camshaft 21, there is provided a cam position sensor 39 that generates a pulsed signal when the piston 1*c* of a specific cylinder (e.g., a first cylinder #1) reaches compression top dead center (TDC). The cam position sensor 39 is, e.g., an electromagnetic pickup, is disposed so as to face one tooth (not shown) on the outer peripheral surface of a rotor formed integrally with the intake camshaft 21, and outputs a pulsed signal (a voltage pulse) when the intake camshaft 21 rotates. Note that each of the intake camshaft 21 and the exhaust camshaft 22 rotates at a rotational speed that is a half (½) of a rotational speed of the crankshaft 15, and hence the cam position sensor 39 generates one pulsed signal every time the crankshaft 15 makes two rotations (i.e., every time the crankshaft 15 rotates by 720°).

In the intake port 11*a* of the intake passage 11, an injector (a fuel injection valve) 2 that injects fuel is disposed. The injector 2 is provided in each of the cylinders #1 to #4. The injectors 2 are connected to a common delivery pipe 101. Fuel stored in a fuel tank 104 of a fuel supply system 100 described later is supplied to the delivery pipe 101, and the fuel is injected into the intake port 11*a* from the injector 2. The injected fuel is mixed with intake air to generate an air-fuel mixture and the air-fuel mixture is introduced into the combustion chamber 1*d* of the engine 1. The air-fuel mixture (fuel+air) introduced into the combustion chamber 1*d* is ignited by the spark plug 3 and is combusted. By high-temperature and high-pressure combustion gas generated at this point, the piston 1*c* is caused to reciprocate, the crankshaft 15 is cause to rotate, and a driving force (output torque) of the engine 1 is thereby obtained. The combustion gas is discharged into the exhaust passage 12 as the exhaust valve 14 is opened. Note that, in the engine 1, the combustion occurs in the order of the first cylinder #1, the third cylinder #3, the fourth cylinder #4, and the second cylinder #2. The operation state of the engine 1 is controlled by the ECU 200.

On the other hand, the fuel supply system 100 includes the delivery pipe 101 connected to the injectors 2 of the individual cylinders #1 to #4, a fuel supply pipe 102 connected to the delivery pipe 101, a fuel pump (e.g., an electric pump) 103, and the fuel tank 104. The fuel stored in the fuel tank 104 is supplied to the delivery pipe 101 via the fuel supply pipe 102 by driving the fuel pump 103. By the fuel supply system 100 having the above structure, the fuel is supplied to the injector 2 of each of the cylinders #1 to #4.

In the fuel supply system 100 having the above structure, the operation of the fuel pump 103 is controlled by the ECU 200.

(ECU)

Figure 5:
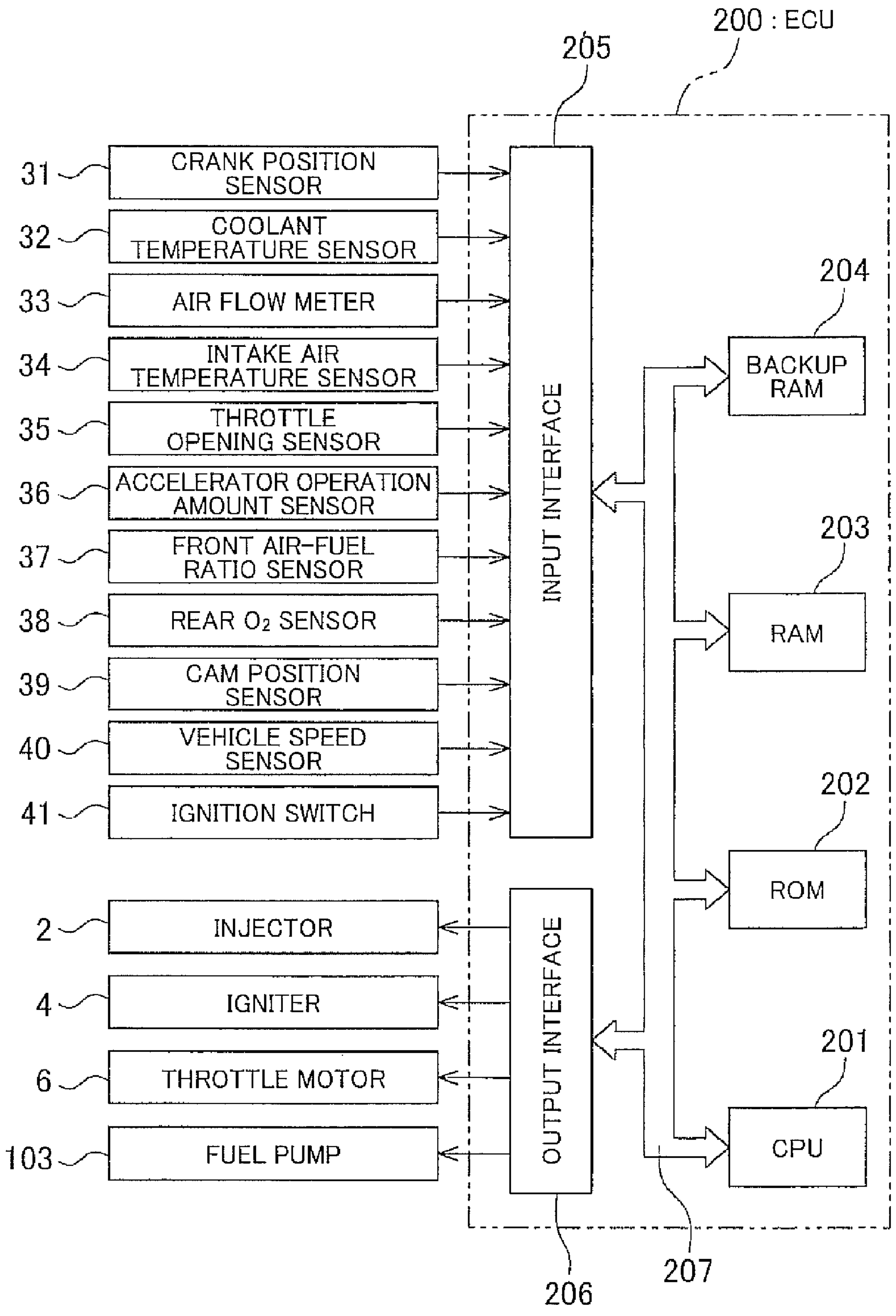

As shown in FIG. 5, an electronic control unit (ECU) 200 includes a central processing unit (CPU) 201, a read only memory (ROM) 202, a random access memory (RAM) 203, and a backup RAM 204.

The ROM 202 stores various control programs and maps or the like that are referenced when the various control programs are executed. The CPU 201 executes various arithmetic processing operations based on the various control programs and maps stored in the ROM 202. In addition, the RAM 203 is a memory that temporarily stores the result of the arithmetic processing operation in the CPU 201 and data input from individual sensors, and the backup RAM 204 is a nonvolatile memory that stores, e.g., data that should be retained when the engine 1 is stopped.

The CPU 201, the ROM 202, the RAM 203, and the backup RAM 204 are connected to each other via a bus 207, and are also connected to an input interface 205 and an output interface 206.

To the input interface 205, there are connected various sensors such as the crank position sensor 31, the coolant temperature sensor 32, the air flow meter 33, the intake air temperature sensor 34, the throttle opening sensor 35, an accelerator operation amount sensor 36 that outputs a detection signal corresponding to an operation amount (a depression amount) of an accelerator pedal, the front air-fuel ratio sensor 37, the rear $O_2$ sensor 38, the cam position sensor 39, and a vehicle speed sensor 40 that detects the speed of the vehicle. In addition, an ignition switch (start switch) 41 is connected to the input interface 205.

To the output interface 206, there are connected the injector 2, the igniter 4 of the spark plug 3, the throttle motor 6 of the throttle valve 5, and the fuel pump 103 of the fuel supply system 100.

Based on detection signals of the various sensors mentioned above, the ECU 200 executes various controls for the engine 1 including a drive control for the injector 2 (a fuel injection amount adjustment control), an ignition time control for the spark plug 3, and a drive control for the throttle motor 6 of the throttle valve 5 (an intake air amount control). Further, the ECU 200 executes an "air-fuel ratio feedback control", an "inter-cylinder air-fuel ratio imbalance determination process", a "learned imbalance value correction process", and a "sub feedback control when imbalance occurs" described later.

The air-fuel ratio imbalance determination apparatus for the multi-cylinder internal combustion engine of the invention is implemented by the programs executed by the ECU 200.

(Air-fuel Ratio Feedback Control)

The ECU 200 executes the air-fuel ratio feedback control (a stoichiometric control) in which the oxygen concentration in the exhaust gas is calculated based on the outputs from the front air-fuel ratio sensor 37 and the rear $O_2$ sensor 38 disposed in the exhaust passage 12 of the engine 1, and the amount of the fuel injected into the combustion chamber 1*d* from the injector 2 is controlled such that the actual air-fuel ratio obtained from the calculated oxygen concentration matches a target air-fuel ratio (e.g., the stoichiometric air-fuel ratio). Specific processes of the air-fuel ratio feedback control will be described.

First, the three-way catalyst 8 exerts the function of oxidizing unburned components (HC, CO) and, at the same time, reducing nitrogen oxides (NOx) when the air-fuel ratio substantially corresponds to the stoichiometric air-fuel ratio (e.g., A/F=about 14.6). In addition, as described above, the three-way catalyst 8 has the function of storing oxygen (the oxygen storage function, the $O_2$ storage function), and is capable of purifying HC, CO, and NOx with the oxygen storage function even when the air-fuel ratio is deviated from the stoichiometric air-fuel ratio to some extent. That is, in a case where the air-fuel ratio of the engine 1 becomes lean and a large amount of NOx is contained in the exhaust gas flowing into the three-way catalyst 8, the three-way catalyst 8 takes oxygen molecules from NOx, stores the oxygen molecules, and thus, reduces NOx to purify (convert) NOx. In addition, in a case where the air-fuel ratio of the engine 1 becomes rich and a large amount of HC and CO is contained in the exhaust gas flowing into the three-way catalyst 8, the three-way catalyst 8 gives stored oxygen molecules to HC and CO, and thus oxidizes HC and CO to purify (convert) HC and CO.

Consequently, in order for the three-way catalyst 8 to efficiently purify a large amount of HC and CO continuously flowing into the three-way catalyst 8, the three-way catalyst 8 is required to store a large amount of oxygen and, in order for the three-way catalyst 8 to efficiently purify a large amount of NOx continuously flowing into the three-way catalyst 8, the three-way catalyst 8 is required to be capable of storing a sufficient amount of oxygen. As is clear from the foregoing, the purification capability of the three-way catalyst 8 depends on the maximum amount of oxygen that can be stored in the three-way catalyst 8 (the maximum oxygen storage amount).

On the other hand, the three-way catalyst 8 is degraded by poisoning by lead and sulfur contained in the fuel or heat applied to the three-way catalyst 8, and the maximum oxygen storage amount is gradually lowered with the degradation. In order to maintain good emission even when the maximum oxygen storage amount is lowered, the air-fuel ratio of gas discharged from the three-way catalyst 8 needs to be controlled to be extremely close to the stoichiometric air-fuel ratio.

Accordingly, in this example, the air-fuel ratio feedback control is executed. Specifically, a main feedback control for bringing the air-fuel ratio of the exhaust gas upstream of the three-way catalyst 8 (upstream of the three-way catalyst 8 with respect to the exhaust gas flow) to a value close to the stoichiometric air-fuel ratio based on the output of the front air-fuel ratio sensor 37 and a sub feedback control (sub F/B control) for compensating for the deviation in the main feedback control based on the output of the rear $O_2$ sensor 38 are combined and executed.

In the main feedback control, an increase and a decrease in the fuel injection amount from the injector 2 are adjusted such that the air-fuel ratio of the exhaust gas detected based on the output of the front air-fuel ratio sensor 37 matches the stoichiometric air-fuel ratio. More specifically, when the detected air-fuel ratio of the exhaust gas is richer than the stoichiometric air-fuel ratio, the fuel injection amount is decreased and, when the detected air-fuel ratio of the exhaust gas is leaner than the stoichiometric air-fuel ratio, the fuel injection amount is increased.

According to the above main feedback control, in theory, it is possible to maintain the air-fuel ratio of the exhaust gas flowing into the three-way catalyst 8 at the stoichiometric air-fuel ratio. Subsequently, if such a state is strictly maintained, the amount of stored oxygen of the three-way catalyst 8 is maintained at a substantially constant value, and hence it is possible to completely prevent the outflow of the exhaust gas containing the unburned component to an area downstream of the three-way catalyst 8.

A certain error is included in the output of the front air-fuel ratio sensor 37. In addition, there is a certain variation in the injection characteristic of the injector 2. As a result, realistically, it is difficult to control the air-fuel ratio of the exhaust gas upstream of the three-way catalyst 8 such that the air-fuel ratio thereof matches the stoichiometric air-fuel ratio only by executing the main feedback control.

For this reason, even when the main feedback control is executed, there are cases where the exhaust gas containing the unburned component flows out to the area downstream of the three-way catalyst 8. In other words, even when the main feedback control is executed, there are cases where the overall air-fuel ratio of the exhaust gas upstream of the three-way catalyst 8 is deviated to the rich side or the lean side. As a result, there are cases where rich exhaust gas containing HC or CO or lean exhaust gas containing NOx flows out to the area downstream of the three-way catalyst 8.

When such an outflow of the exhaust gas occurs, the rear $O_2$ sensor 38 generates a rich output or a lean output according to the air-fuel ratio of the exhaust gas. When the rich output is generated from the rear $O_2$ sensor 38, it is possible to determine that the overall air-fuel ratio of the exhaust gas upstream of the three-way catalyst 8 is deviated to the rich side and, when the lean output is generated from the rear $O_2$ sensor 38, it is possible to determine that the overall air-fuel ratio thereof is deviated to the lean side.

In the sub feedback control, when the output of the rear $O_2$ sensor 38 has a value indicative of the air-fuel ratio leaner than the stoichiometric air-fuel ratio, a sub feedback correction amount is determined by executing proportional integral processing (PID processing) on the deviation between the output Voxs of the rear $O_2$ sensor 38 and a target value Voxsref that substantially corresponds to the stoichiometric air-fuel ratio. Subsequently, the feedback control is executed such that the output vabyfs of the front air-fuel ratio sensor 37 is corrected by the amount corresponding to the sub feedback correction amount, the actual air-fuel ratio of the engine 1 is thereby set to be apparently leaner than the detected air-fuel ratio of the front air-fuel ratio sensor 37, and the corrected apparent air-fuel ratio matches the target air-fuel ratio (the target air-fuel ratio of the engine 1, the stoichiometric air-fuel ratio in this example).

Similarly, when the output Voxs of the rear $O_2$ sensor 38 has a value indicative of the air-fuel ratio richer than the stoichiometric air-fuel ratio, the sub feedback correction amount is determined by executing the proportional integral processing (PI or PID processing) on the deviation between the output Voxs of the rear $O_2$ sensor 38 and the target value Voxsref that substantially corresponds to the stoichiometric air-fuel ratio. Subsequently, the feedback control is executed such that the output vabyfs of the front air-fuel ratio sensor 37 is corrected by the amount corresponding to the sub feedback correction amount, the actual air-fuel ratio of the engine 1 is thereby set to be apparently richer than the detected air-fuel ratio of the front air-fuel ratio sensor 37, and the corrected apparent air-fuel ratio matches the target air-fuel ratio (the target air-fuel ratio of the engine 1, the stoichiometric air-fuel ratio in this example).

With the above controls, the air-fuel ratio of the exhaust gas at a position downstream of the three-way catalyst 8 matches the target air-fuel ratio (substantially the stoichiometric air-fuel ratio) at the corresponding position.

Note that a process for learning the sub feedback correction amount as a learned value during the sub feedback control is referred to as "sub feedback learning".

(Inter-Cylinder Air-Fuel Ratio Imbalance Determination Process)

Next, a description will be given of an inter-cylinder air-fuel ratio imbalance determination process executed by the ECU 200.

In a case where an abnormality that influences all of the cylinders #1 to #4 of the engine 1 occurs in the fuel supply system such as the injector 2 or the like or an air system such as the air flow meter 33 or the like, the absolute value of the correction amount of the main feedback control of the air-fuel ratio is increased, and hence the abnormality can be detected by monitoring the absolute value thereof using the ECU 200.

For example, during the air-fuel ratio feedback control (during the stoichiometric control), in a case where the overall fuel injection amount is deviated from a stoichiometric equivalent amount by 5% (i.e., the fuel injection amount is deviated from the stoichiometric equivalent amount by 5% in all of the cylinders #1 to #4), the feedback correction amount of the main feedback control becomes a value that corrects the deviation amount of 5%, i.e., becomes the correction amount corresponding to −5%. Thus, it is possible to detect that the deviation of 5% occurs in the fuel supply system or the air system, using the feedback correction amount. When the feedback correction amount becomes equal to or larger than a predetermined determination threshold value, it is possible to detect the abnormality in the fuel supply system or the air system.

Figure 6:
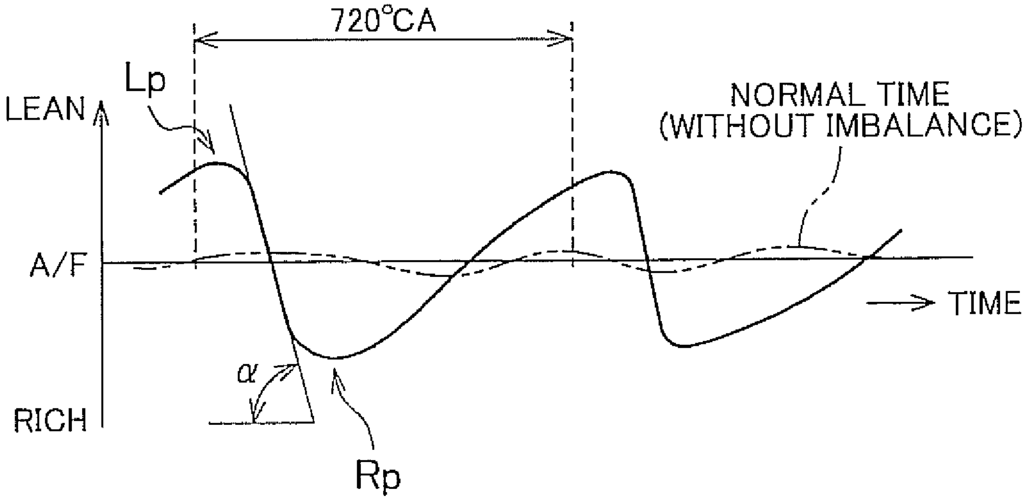
FIG. 6 is a view showing an output waveform of the front air-fuel ratio sensor.

On the other hand, there are cases where the fuel supply system or the air system is not deviated as a whole but an air-fuel ratio variation (imbalance) among cylinders occurs. For example, there are cases where the actual air-fuel ratio varies among the cylinders due to a variation in the injection performance of the injectors 2 provided in the individual cylinders and a variation in intake air distribution amount among the cylinders. In a case where the inter-cylinder air-fuel ratio imbalance occurs, a fluctuation in exhaust gas air-fuel ratio in one engine cycle (=720° CA) is increased and the output of the front air-fuel ratio sensor 37 is fluctuated. FIG. 6 shows an example of an output waveform of the front air-fuel ratio sensor 37. In FIG. 6, the waveform in a one-dot chain line indicates a state at a normal time, i.e., a state in which the air-fuel ratio imbalance does not occur, while the waveform in a solid line indicates a state in which the air-fuel ratio imbalance occurs.

As shown in FIG. 6, the output waveform of the front air-fuel ratio sensor 37 (hereinafter also referred to as an A/F sensor output waveform) tends to oscillate relative to the stoichiometric air-fuel ratio and, when the inter-cylinder air-fuel ratio imbalance occurs, the amplitude of the oscillation of the A/F sensor output waveform is increased in accordance with the degree of the imbalance. By utilizing this phenomenon, it is possible to determine the state of the inter-cylinder air-fuel ratio imbalance. Hereinbelow, an example of the imbalance determination method will be described.

In this example, as described above, by utilizing the fact that the amplitude of oscillation of the output waveform of the front air-fuel ratio sensor 37 is larger as the inter-cylinder air-fuel ratio imbalance is larger, i.e., the fact that the gradient of the A/F sensor output waveform is larger as the imbalance ratio is larger (see FIG. 6), it is determined whether or not the inter-cylinder air-fuel ratio imbalance occurs from the gradient of the A/F sensor output waveform.

Specifically, based on the output signal of the front air-fuel ratio sensor 37, the A/F sensor output waveform is monitored and the gradient of the A/F sensor output waveform (an air-fuel ratio gradient $\alpha$ in a section from a lean peak Lp to a rich peak Rp: see FIG. 6) is acquired. Based on the acquired air-fuel ratio gradient (the A/F gradient) α, the imbalance ratio is estimated by referring to a map (created by acquiring the relationship between the air-fuel ratio gradient and the imbalance ratio by means of a test, calculation, or the like and mapping the relationship therebetween) and the like. Hereinafter, this process for estimating the imbalance ratio may be referred to as an "imbalance learning", and the estimated imbalance ratio obtained by the estimation process may be referred to as a "learned imbalance value".

Subsequently, the estimated imbalance ratio estimated in this manner is compared with a predetermined determination threshold value Tha and, in a case where the estimated imbalance ratio is equal to or larger than the determination threshold value Tha, it is determined that the inter-cylinder imbalance state occurs. Note that it may be determined whether the imbalance state occurs by comparing the air-fuel ratio gradient α with a predetermined determination threshold value.

The imbalance ratio (ratio of imbalance) mentioned herein is a parameter related to the degree of the inter-cylinder air-fuel ratio variation, and is a value indicative of the ratio by which the air-fuel ratio of a cylinder in which the air-fuel ratio deviation occurs (an imbalance cylinder) deviates from the air-fuel ratio (equivalent to the stoichiometric air-fuel ratio) of a cylinder in which the air-fuel ratio deviation does not occur (a balance cylinder) in a case where the air-fuel ratio deviation occurs in only one cylinder among a plurality of cylinders.

In addition, with regard to the determination threshold value Tha used for the above imbalance determination process, for example, the upper limit of a range in which the air-fuel ratios among the cylinders of the engine 1 can be determined to be balanced (can be determined to be normal) is acquired by means of a test, calculation, or the like, and a value obtained based on the upper limit is used as the determination threshold value.

In addition, it is possible to determine the above air-fuel ratio gradient α by calculating the change amount (the previous value−the present value=ΔAF) of the output of the front air-fuel ratio sensor 37 per sampling time t (the arithmetic processing interval of the ECU 200: e.g., 4 msec) for the detection value of the front air-fuel ratio sensor 37 (the air-fuel ratio gradient α=ΔAF/t). Note that, with regard to the air-fuel ratio gradient α, the change amount (the previous value−the present value=ΔAF) of the output of the front air-fuel ratio sensor 37 at every sampling time mentioned above in the section from the lean peak Lp to the rich peak Rp is added up, and a value obtained by dividing the added-up value (the sum of the air-fuel ratio gradient) by the number of times of the addition may also be used as the air-fuel ratio gradient (an added-up average value) α.

Note that, in the A/F sensor output waveform shown in FIG. 6, it is also possible to acquire the gradient in the section from the rich peak to the lean peak, and to perform the determination as to whether the imbalance state occurs and the imbalance learning based on the acquired air-fuel ratio gradient.

(Learned Imbalance Value Correction Process)

In the embodiment, since the front air-fuel ratio sensor 37 disposed in the exhaust passage 12 (at a position upstream of the catalyst) is the air-fuel ratio sensor with the catalyst layer, as described above, it is possible to enhance the accuracy of detection of the air-fuel ratio by oxidizing (purifying) $H_2$ contained in the exhaust gas in the catalyst layer. However, the exhaust gas component reaches the exhaust side of the sensor after being reacted and diffused in the catalyst layer, and hence the response of the sensor output is delayed. When such a response delay is caused, the air-fuel ratio gradient α (see FIG. 6) used for the determination regarding the air-fuel ratio imbalance state is reduced. In order to solve such a problem (in order to prevent the response delay due to the catalyst layer), the accuracy of estimation of the imbalance ratio is improved and S/N at the imbalance time and the normal time is ensured by performing enrichment in which the target air-fuel ratio is set to be rich (an air-fuel ratio enrichment control) to thereby increase the air-fuel ratio gradient α.

However, in a case where the degree of richness provided by the above air-fuel ratio enrichment control is insufficient, the estimated imbalance ratio estimated from the air-fuel ratio gradient α (the learned imbalance value) becomes smaller than the actual imbalance ratio. When such a situation occurs, in spite of the actual occurrence of the imbalance state (the occurrence of an abnormality), there are cases where the learned imbalance value does not exceed the determination threshold value Tha and it is erroneously determined that the imbalance state does not occur. In addition, there are cases where the change of the target air-fuel ratio according to the learned imbalance value becomes inadequate and an emission is deteriorated.

To cope with this, in the embodiment, in the case where the degree of richness provided by the air-fuel ratio enrichment control is insufficient, the accuracy of the learned imbalance value is improved by correcting the learned imbalance value. A description will be given of an example of the correction process (a learned imbalance value correction process) with reference to a flowchart of FIG. 7. A process routine of FIG. 7 is repeatedly executed at every predetermined time period (e.g., 4 msec) in the ECU 200.

Before the description of the process routine of FIG. 7, a description will be given of a flag used for the learned imbalance value correction process and an air-fuel ratio enrichment amount.

(With Regard to the Flag Used for the Correction Process)

Figure 7:
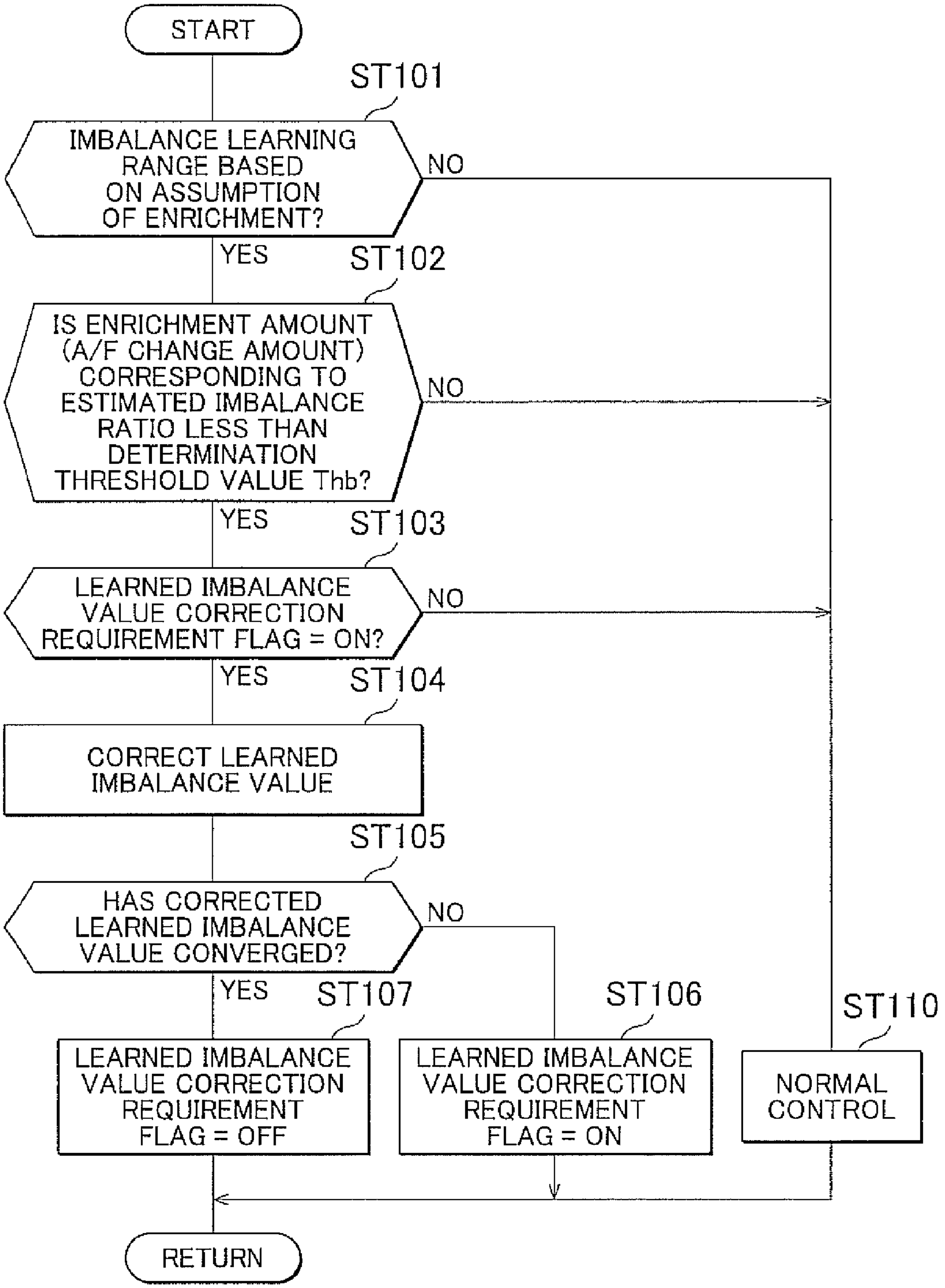
FIG. 7 is a flowchart showing an example of a learned imbalance value correction process in an embodiment of the invention.

In the correction process of FIG. 7, a "learned imbalance value correction requirement flag" is used. The initial value of the "learned imbalance value correction requirement flag" when the ignition switch is ON (at IG-ON) is set to "ON". In the case of a hybrid vehicle, the initial value thereof when the start switch is ON (at READY-ON) is set to "ON".

Further, once the "learned imbalance value correction requirement flag" is turned OFF in one trip (from IG-ON to IG-OFF or from READY-ON to READY-OFF), the "learned imbalance value correction requirement flag" is not turned ON again during the trip.

(Air-Fuel Ratio Enrichment Amount)

Next, the air-fuel ratio enrichment amount will be described.

As described above, the ECU 200 executes the process in which the estimated imbalance ratio of the inter-cylinder air-fuel ratio (the learned imbalance value) is calculated based on the output signal of the front air-fuel ratio sensor 37 and it is determined whether or not the imbalance (the imbalance state) occurs based on the estimated imbalance ratio. In a case where the determination result indicates that "the imbalance occurs", the ECU 200 determines the air-fuel ratio enrichment amount based on the estimated imbalance ratio to execute the air-fuel ratio enrichment control.

Figure 8:
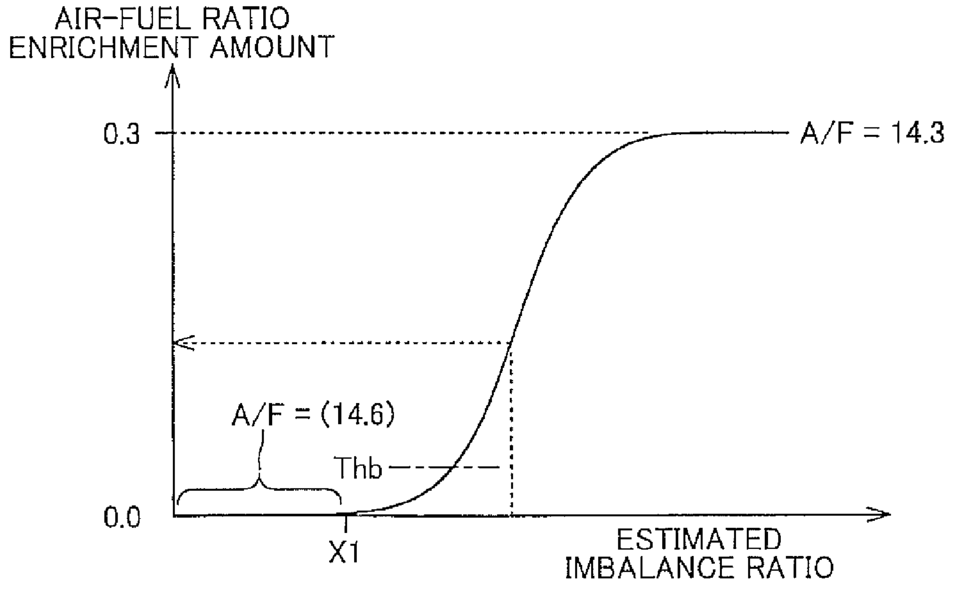
FIG. 8 is a view showing an example of a map for determining an air-fuel ratio enrichment amount in the embodiment of the invention.

The air-fuel ratio enrichment amount mentioned herein is a change amount of the target air-fuel ratio (an A/F change amount) with respect to the stoichiometric air-fuel ratio (e.g., 14.6) (i.e., an amount by which the target air-fuel ratio is changed with respect to the stoichiometric air-fuel ratio), and the air-fuel ratio enrichment amount is determined by referring to a map shown in FIG. 8, based on the above estimated imbalance ratio (the learned imbalance value). Subsequently, the target air-fuel ratio is set by using the determined air-fuel ratio enrichment amount. For example, in a case where the enrichment amount is 0.15, the target air-fuel ratio is set to 14.45 (14.6 (the stoichiometric air-fuel ratio)−0.15 (the enrichment amount)), and the air-fuel ratio enrichment control is executed by using the target air-fuel ratio.

The map of FIG. 8 is created by mapping a value (the enrichment amount) that allows the imbalance learning with high accuracy, and that is obtained by means of a test, calculation, or the like in consideration of the above influence (the reaction delay) by the catalyst layer of the front air-fuel ratio 37, using the imbalance ratio as a parameter. The map of FIG. 8 is stored in the ROM 202 of the ECU 200.

In the map of FIG. 8, the horizontal axis indicates the estimated imbalance ratio, while the vertical axis indicates the air-fuel ratio enrichment amount (the air-fuel ratio change amount relative to the stoichiometric air-fuel ratio). In FIG. 8, in a case where the estimated imbalance ratio (the learned imbalance value) is smaller than x1 of the horizontal axis, the air-fuel ratio cannot be enriched (i.e., the degree of richness provided by the air-fuel ratio enrichment control is insufficient), and hence the value of the air-fuel ratio gradient used for the air-fuel ratio imbalance determination remains small.

In addition, a one-dot chain line shown in FIG. 8 indicates a determination threshold value Thb for determining whether or not the degree of richness provided by the air-fuel ratio enrichment control is insufficient (the enrichment amount is insufficient), and the determination threshold value Thb is used for the determination process in Step ST102 of FIG. 7. With regard to the determination threshold value Thb, the lower limit value of the A/F change amount (the A/F change amount with respect to the stoichiometric air-fuel ratio) that allows the air-fuel ratio enrichment is determined by means of a test, calculation, or the like, and a value obtained based on the lower limit value is set as the determination threshold value Thb (e.g., Thb=0.05).

(Description of the Process Routine)

The process routine of FIG. 7 is started in a case where the determination result of the air-fuel ratio imbalance determination based on the estimated imbalance ratio indicates that "the imbalance occurs".

When the process routine of FIG. 7 is started, firstly in Step ST101, it is determined whether or not the operation state of the engine 1 (e.g., an engine rotational speed, load, and the like) is in an imbalance learning range based on the assumption of the enrichment (an imbalance learning range based on the assumption that the enrichment of the air-fuel ratio is executed). In a case where the determination result is negative (NO), the flow proceeds to Step ST110 where a normal control (a normal imbalance learning process or the like) is performed without performing the learned imbalance value correction process, and the flow returns. In a case where the determination result in Step ST101 is affirmative (YES) (in a case where the engine operation state is in the imbalance learning range during the execution of the air-fuel ratio enrichment control), the flow proceeds to Step ST102.

The imbalance learning range used for the determination process in Step ST101 mentioned herein is an engine operation range in which the imbalance state is to be determined, and is a range set in advance by means of a test, calculation (simulation), or the like in consideration of a range where the emission is good, running modes (regulations), and a range where operation frequency is high.

In Step ST102, it is determined whether or not the enrichment amount (the A/F change amount) corresponding to the above estimated imbalance ratio (the learned imbalance value) is less than the determination threshold value Thb shown in FIG. 8. In a case where the determination result is negative (NO), the flow proceeds to Step ST110. In a case where the determination result in Step ST102 is affirmative (YES), it is determined that the degree of richness provided by the air-fuel ratio enrichment control is insufficient, and the flow proceeds to Step ST103.

In Step ST103, it is determined whether or not the learned imbalance value correction requirement flag is ON. As described above, the initial value of the learned imbalance value correction requirement flag at IG-ON (at Ready-On) is set to "ON". Therefore, if the operation state of the engine 1 falls within the imbalance learning range, the initial determination result in Step ST103 inevitably becomes affirmative (YES) and the flow proceeds to Step ST104, irrespective of the presence or absence of determination of the imbalance state.

Figure 9:
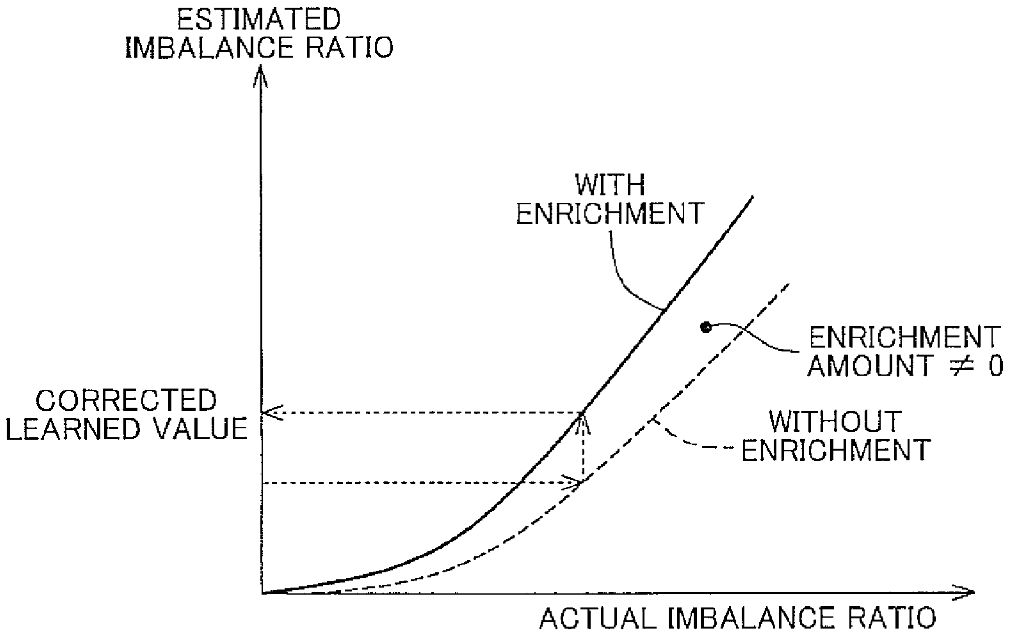
FIG. 9 is a view showing an example of a map showing a relationship between an actual imbalance ratio and an estimated imbalance ratio in the embodiment of the invention.

In Step ST104, based on the present estimated imbalance ratio, the learned imbalance value is corrected by using a map shown in FIG. 9. Specifically, the correction is performed by a process in which an actual imbalance ratio without enrichment (an actual imbalance ratio in a case where the air-fuel ratio enrichment is not performed) is determined based on an intersection point of the present estimated imbalance ratio and a line without enrichment, that is, a line showing the case where the air-fuel ratio enrichment is not performed (a broken line), and a corrected learned imbalance value is read (obtained) based on an intersection point of the actual imbalance ratio and a line with enrichment, that is, a line showing the case where the air-fuel ratio enrichment is performed (a solid line). With such a correction process, the learned imbalance value can be corrected to be a larger value.

The map of FIG. 9 is created by mapping the relationship between the actual imbalance ratio and the estimated imbalance ratio determined by means of a test, calculation, or the like. The map of FIG. 9 is stored in the ROM 202 of the ECU 200.

Note that, in a case where the determination result in Step ST102 is affirmative (YES) (i.e., the air-fuel ratio enrichment amount is less than the determination threshold value Thb), and the air-fuel ratio setting amount is not "0" (the enrichment amount≠0: e.g., a case indicated by a black circle in FIG. 9), the corrected learned imbalance value may appropriately be determined by, e.g., linear interpolation using the actual imbalance ratio in the case where the air-fuel ratio enrichment is not performed (the value at the intersection point with the broken line) and the estimated (obtained) actual imbalance ratio in the case where the air-fuel ratio enrichment is performed (the value at the intersection point with the solid line).

Next, in Step ST105, it is determined whether or not the corrected learned imbalance value has converged. Specifically, it is determined whether or not the change amount of the corrected learned imbalance value falls within a predetermined range (a range in which it can be determined that the learned imbalance value has converged). In a case where the determination result is negative (the learned imbalance value is out of the predetermined range), a process, in which the flow returns with the learned imbalance value correction requirement flag being kept ON (Step ST106) and the correction of the learned imbalance value (Step ST104) is executed again, is repeatedly executed. Subsequently, when the correction of the learned imbalance value is repeated and the corrected learned imbalance value has converged (when the determination result in Step ST105 is affirmative (YES)), the learned imbalance value correction requirement flag is turned OFF (Step ST107).

Thus, when the correction of the learned imbalance value is repeated and the learned imbalance value has converged, the learned imbalance value becomes larger than X1 shown in FIG. 8 (the air-fuel ratio enrichment amount becomes larger than the determination threshold value Thb), and the proper air-fuel ratio enrichment amount corresponding to the imbalance learned amount is obtained. With this, it becomes possible to accurately perform the determination regarding the air-fuel ratio imbalance state based on the air-fuel ratio gradient $\alpha$.

Note that, with regard to the convergence determination process for the corrected learned imbalance value, for example, it may be determined that the corrected learned imbalance value has converged in a case where the number of times of correction of the learned imbalance value (the number of times of execution of Step ST104) is equal to or larger than a predetermined number of times.

(Effect)

Thus, according to the embodiment, in the case where the engine operation state is in the imbalance learning range during the execution of the air-fuel ratio enrichment control, when the air-fuel ratio enrichment amount is small, the correction that increases the learned imbalance value is performed. With such a correction, it is possible to cause the learned imbalance value to approach the actual imbalance ratio, and hence it is possible to improve the accuracy of the imbalance learning. With this, it is possible to perform the determination regarding the air-fuel ratio imbalance state based on the air-fuel ratio gradient with improved accuracy. In addition, it is possible to reduce (prevent) the possibility of occurrence of an erroneous abnormality by not performing (stopping) the correction operation after the convergence of the learned imbalance value.

(Sub Feedback Control When the Imbalance Occurs)

Next, a description will be given of a sub feedback control at the time when the imbalance occurs, which is executed by the ECU 200.

First, in the embodiment, as described above, the air-fuel ratio sensor with the catalyst layer is provided as the front air-fuel ratio sensor 37 disposed in the exhaust passage 12 (at a position upstream of the catalyst), and the inter-cylinder air-fuel ratio imbalance state is determined based on the amount of change per unit time in the air-fuel ratio detected by the front air-fuel ratio sensor 37 with the catalyst layer (i.e., the air-fuel ratio gradient). In the case where it is determined that the imbalance state occurs (the imbalance occurs), the air-fuel ratio enrichment control is performed in order to reduce the emission and improve the accuracy of the imbalance learning, and the sub feedback control or the sub feedback learning is stopped during the air-fuel ratio enrichment control.

However, even when the target air-fuel ratio in the control is set to be rich by the air-fuel ratio enrichment control, the atmosphere in the three-way catalyst 8 may be lean (the output of the rear $O_2$ sensor 38 may be the lean output) due to the atmosphere in the three-way catalyst 8 before the air-fuel ratio is set to be rich (before the air-fuel ratio enrichment is performed) and the control amount (the correction amount) of the main feedback control. In this case, NOx may be emitted.

To cope with this, in this example, in a case where the output of the rear $O_2$ sensor 38 is the lean output when the air-fuel ratio enrichment control is performed in order to reduce the emission and improve the accuracy of the imbalance learning, the emission of NOx is suppressed by executing the sub feedback control. A description will be given of a specific example of the control (the sub feedback control when the imbalance occurs) with reference to a flowchart of FIG. 10.

Figure 10:
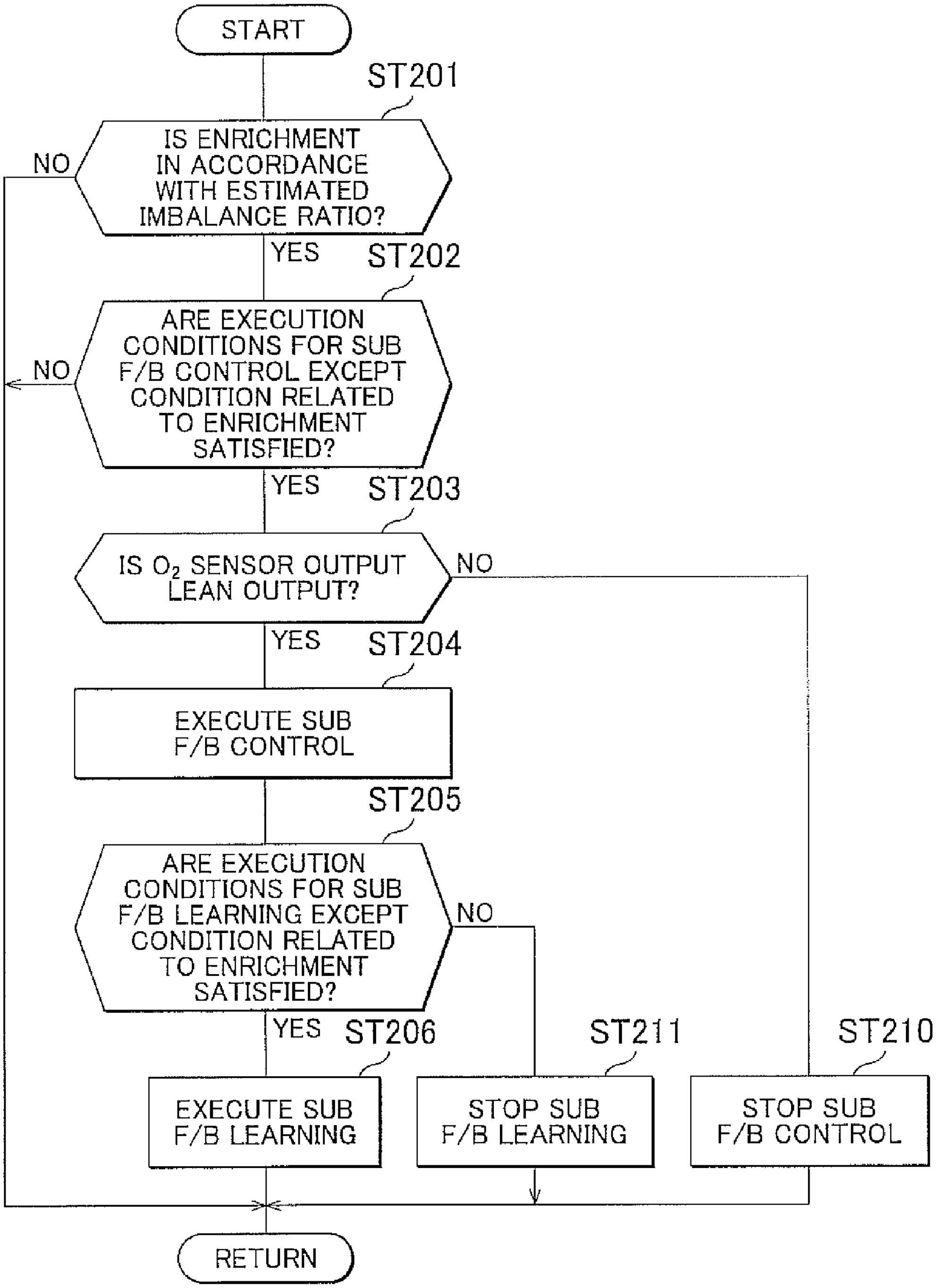
FIG. 10 is a flowchart showing an example of a sub feedback control when imbalance occurs in the embodiment of the invention.

A control routine of FIG. 10 is repeatedly executed at every predetermined time period (e.g., 4 msec) in the ECU 200.

First, as described above, the ECU 200 executes the process in which the estimated imbalance ratio (the learned imbalance value) of the inter-cylinder air-fuel ratio is calculated based on the output signal of the front air-fuel ratio sensor 37 and it is determined whether or not the imbalance (the imbalance state) occurs based on the estimated imbalance ratio. When it is determined that the imbalance occurs, the ECU 200 determines the air-fuel ratio enrichment amount (the A/F change amount) by referring to the map of FIG. 8, based on the above estimated imbalance ratio, to execute the air-fuel ratio enrichment control. With the start of the air-fuel ratio enrichment control, the execution conditions for the sub feedback control and the sub feedback learning are not satisfied, and the control routine of FIG. 10 is started.

When the control routine of FIG. 10 is started, firstly in Step ST201, it is determined whether or not the enrichment is in accordance with the estimated imbalance ratio. Specifically, it is determined whether or not the enrichment amount (the A/F change amount) corresponding to the above estimated imbalance ratio (the learned imbalance value) is equal to or larger than the determination threshold value Thb (see FIG. 8) and, in a case where the enrichment amount is equal to or larger than the determination threshold value Thb, it is determined that "the enrichment is in accordance with the estimated imbalance ratio" (the determination result in Step ST201 is affirmative (YES)), and the flow proceeds to Step ST202. In a case where the determination result in Step ST201 is negative (NO), the flow returns.

Note that, the case where the determination result in Step ST201 is negative (NO) is the same as the case where the determination result in Step ST102 of FIG. 7 is affirmative (YES). Therefore, in the case where the determination result in Step ST201 is negative (NO), the processes in and after Step ST102 of FIG. 7 (the processes of Steps ST102 to ST107) may also be executed.

In Step ST202, it is determined whether or not execution conditions for the sub feedback control (e.g., a condition that a catalyst warm-up operation is already completed, a condition that the coolant temperature of the engine is equal to or higher than a predetermined value, and the like) except a condition related to the air-fuel ratio enrichment in the air-fuel ratio enrichment control are satisfied. In a case where the determination result in Step ST202 is negative (NO), the flow returns. In a case where the determination result in Step ST202 is affirmative (YES), the flow proceeds to Step ST203.

In Step ST203, it is determined whether or not the output of the rear $O_2$ sensor 38 is a value indicative of the air-fuel ratio leaner than the stoichiometric air-fuel ratio. In a case where the determination result in Step ST203 is negative (NO), the sub feedback control is stopped (Step ST210). In a case where the determination result in Step ST203 is affirmative (YES), the sub feedback control is executed (Step ST204).

Next, in Step ST205, it is determined whether or not execution conditions for the sub feedback learning (e.g., the condition that the catalyst warm-up operation is already completed, the condition that the coolant temperature of the engine is equal to or higher than the predetermined value, and the like) except the condition related to the air-fuel ratio enrichment in the air-fuel ratio enrichment control are satisfied. In a case where the determination result in Step ST205 is negative (NO), the sub feedback learning is stopped (Step ST211). In a case where the determination result in Step ST205 is affirmative (YES), the sub feedback learning is executed (Step ST206).

According to the control in this example, in the case where the output of the rear $O_2$ sensor 38 is the lean output when the air-fuel ratio enrichment control is performed in order to reduce the emission and improve the accuracy of the imbalance learning, the sub feedback control is executed, and hence it is possible to cause the atmosphere in the three-way catalyst 8 to correspond to the stoichiometric air-fuel ratio. With this, it is possible to suppress the emission of NOx. In addition, it becomes possible to learn the correction amount of the above sub feedback control.

(First Modification)

Figure 11:
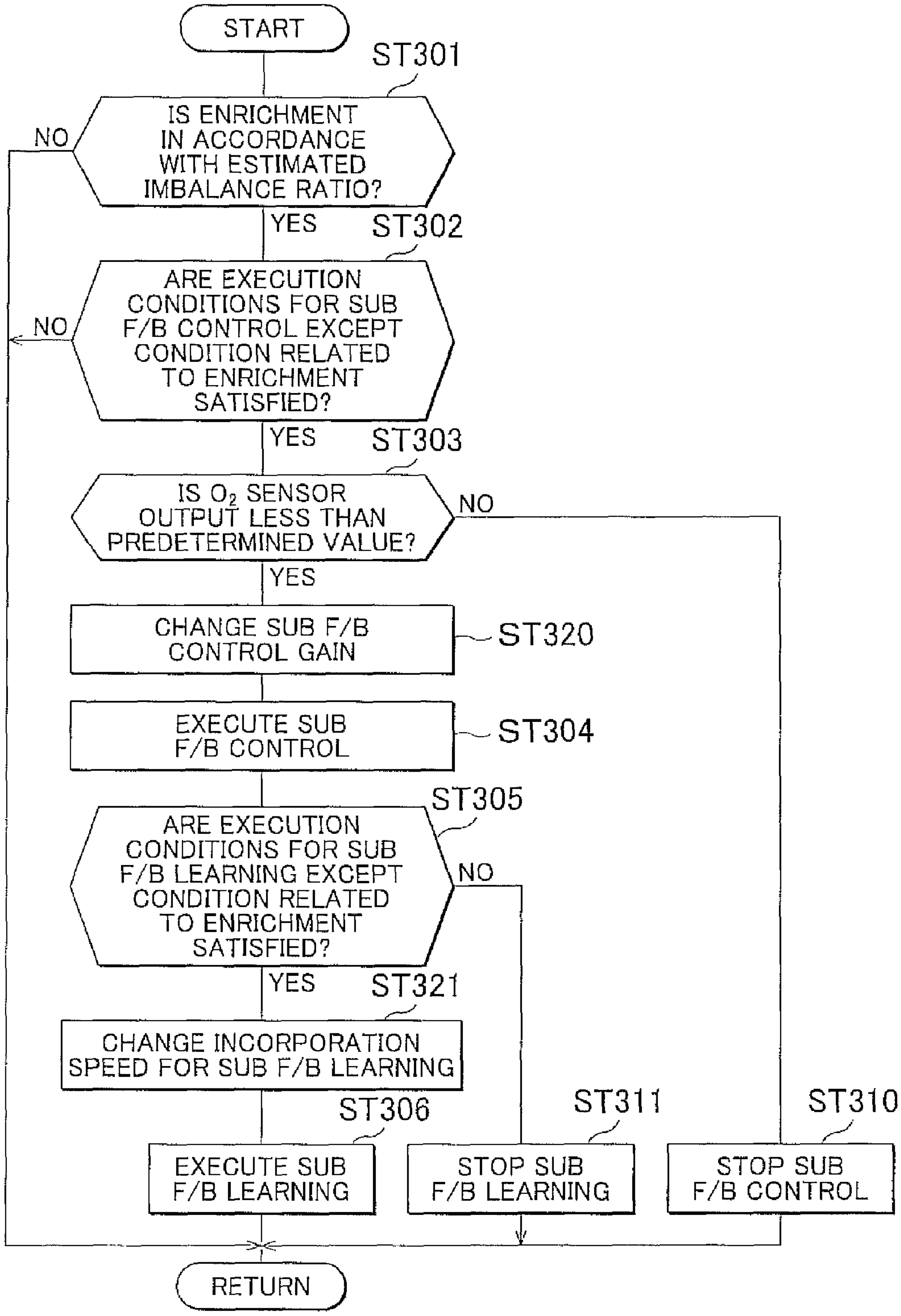
FIG. 11 is a flowchart showing another example of the sub feedback control when the imbalance occurs in the embodiment of the invention.

Next, a description will be given of another example of the sub feedback control when the imbalance occurs with reference to FIG. 11. A control routine of FIG. 11 can also be executed in the ECU 200.

In this example, processes in Steps ST320 and ST321 are added to the above flowchart of FIG. 10. Note that individual processes in Steps ST301 to ST303 of the control routine of FIG. 11 are the same as those in Steps ST201 to ST203 of the control routine of FIG. 10 so that a detailed description thereof will be omitted.

In this example, in a case where the determination result in Step ST303 is affirmative (YES), a gain (proportional integral (PI) gain or proportional integral derivative (PID) gain) of the sub feedback control is changed in Step ST320, and the sub feedback control is executed (Step ST304). Specific examples of the method for changing the gain of the sub feedback control include the following methods.

(a1) The gain is changed by a specific amount (a fixed amount). (b1) The gain is increased or decreased according to the output of the rear $O_2$ sensor 38. (c1) The gain is increased or decreased according to (the output of the rear $O_2$ sensor 38)×(an accumulated intake air amount (or time)). (d1) The gain is increased or decreased according to the intake air amount, or increased or decreased according to the engine rotational speed and an air filling rate. After the above sub feedback control is executed, in a case where the determination result in Step ST305 is affirmative (YES) (in a case where the execution conditions for the sub feedback learning except the condition related to the air-fuel ratio enrichment are satisfied), an incorporation speed for the sub feedback learning (a speed at which the correction amount of the sub feedback control is incorporated into the sub feedback learning) is changed in Step ST321, and the sub feedback learning is executed (Step ST306). Specific examples of the method for changing the incorporation speed for the sub feedback learning include the following methods.

(a2) The incorporation speed is changed by a specific amount (a fixed amount). (b2) The incorporation speed is increased or decreased according to the output of the rear $O_2$ sensor 38. (c2) The incorporation speed is increased or decreased according to (the output of the rear $O_2$ sensor 38)×(the accumulated intake air amount (or time)). (d2) The incorporation speed is increased or decreased according to the intake air amount, or increased or decreased according to the engine rotational speed and the air filling rate.

(Second Modification)

Next, a description will be given of another example of the sub feedback control when the imbalance occurs with reference to FIG. 12. A control routine of FIG. 12 can also be executed in the ECU 200.

Figure 12:
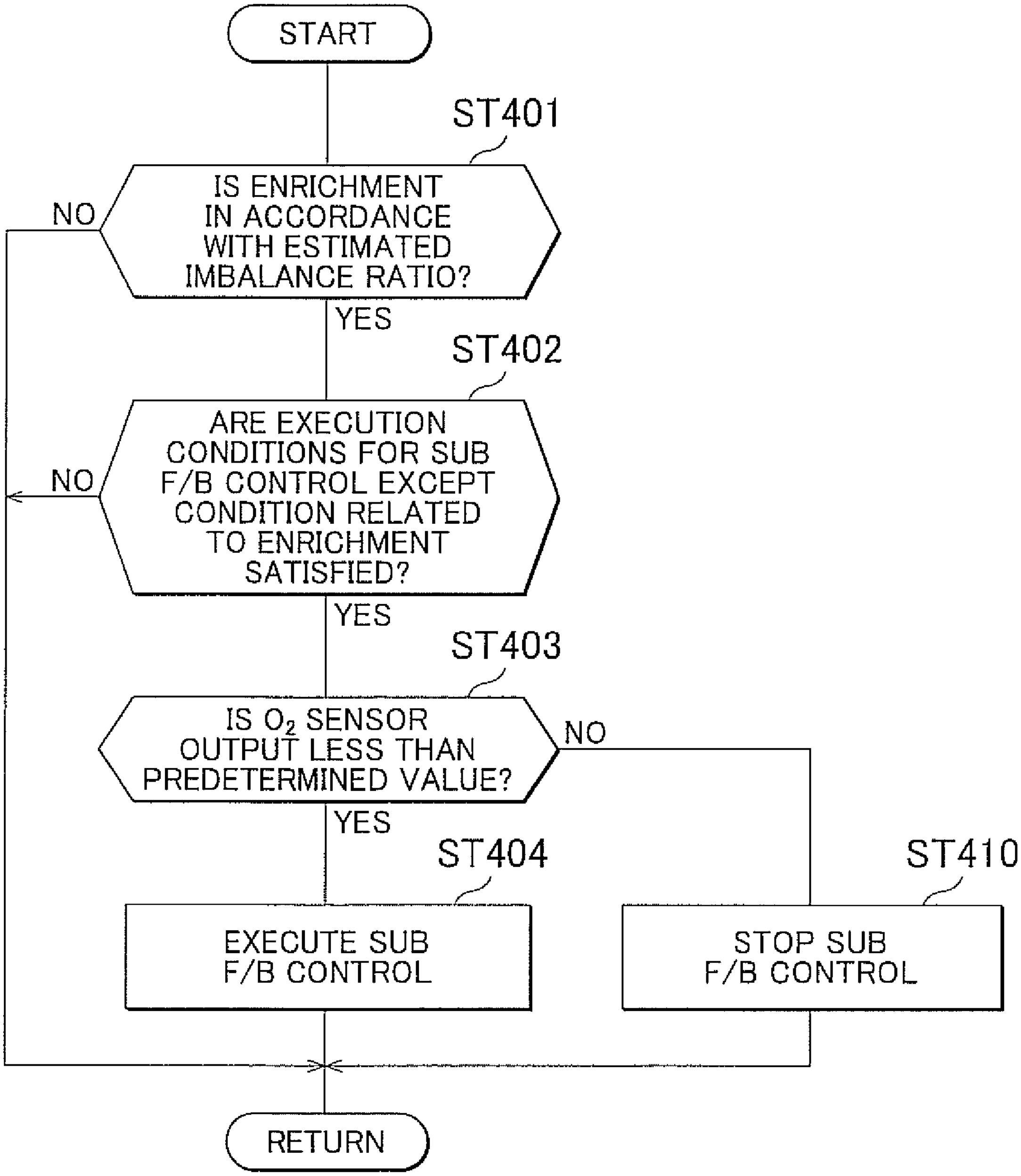
FIG. 12 is a flowchart showing another example of the sub feedback control when the imbalance occurs in the embodiment of the invention.

Individual processes in Steps ST401 to ST404 shown in FIG. 12 are the same as those in Steps ST201 to ST204 in the flowchart of FIG. 10 so that a detailed description thereof will be omitted.

In this example, the processes in Steps ST205 and ST206 are deleted in the flowchart of FIG. 10. That is, in the case where the enrichment is in accordance with the estimated imbalance ratio (in the case where the determination result in Step ST401 is affirmative (YES)), only the sub feedback control is executed (Step ST404) and the sub feedback learning is not executed (remains stopped).

Other Embodiments

Although the invention is applied to the control for the four-cylinder gasoline engine in the above examples, the invention is not limited thereto, and the invention can also be applied to the control for the multi-cylinder internal combustion engine with any number of cylinders such as six cylinders or eight cylinders.

Although the invention is applied to the control for the port-injection multi-cylinder gasoline engine in the above examples, the invention is not limited thereto, and the invention can also be applied to the control for an in-cylinder direct injection multi-cylinder gasoline engine. In addition, the invention can also be applied to the control for a V-type multi-cylinder gasoline engine in addition to an in-line multi-cylinder gasoline engine.

Further, the invention is not limited to the gasoline engine, but the invention can also be applied to the control for, e.g., a flex fuel internal combustion engine in which even alcohol-containing fuel obtained by mixing gasoline and alcohol at any ratio can be used.

Note that, it is conceived that an air-fuel ratio lean setting control in which the target air-fuel ratio is set to the lean side is executed such that a deviation in the output of the front air-fuel ratio sensor 37 (i.e., the influence by the response delay due to the catalyst layer provided in the air-fuel ratio sensor) does not occur, when it is determined that the imbalance state occurs (when the imbalance occurs) in a case where the inter-cylinder air-fuel ratio imbalance determination is performed in the multi-cylinder internal combustion engine including the air-fuel ratio sensor with the catalyst layer. However, if the target air-fuel ratio is set to be lean, engine stall or the like tends to occur and drivability or the like may deteriorate. Thus, it is better to execute the above air-fuel ratio enrichment control.

The invention can be used in the air-fuel ratio imbalance determination apparatus that determines the inter-cylinder air-fuel ratio imbalance state in the multi-cylinder internal combustion engine.

What is claimed is:

1. An air-fuel ratio imbalance determination apparatus for a multi-cylinder internal combustion engine, comprising:

an air-fuel ratio sensor with a catalyst layer disposed in an exhaust passage of the multi-cylinder internal combustion engine; and a control unit configured: to perform determination regarding an air-fuel ratio imbalance state among cylinders of the multi-cylinder internal combustion engine based on an amount of change per unit time in an air-fuel ratio detected by the air-fuel ratio sensor; to execute an air-fuel ratio enrichment control using an air-fuel ratio enrichment amount; and to correct a learned imbalance value to be increased when the air-fuel ratio enrichment amount is smaller than a predetermined determination threshold value in a case where an engine operation state is in an imbalance learning range during execution of the air-fuel ratio enrichment control;

wherein the air-fuel ratio enrichment control is a control for setting a target air-fuel ratio to a value richer than a stoichiometric air-fuel ratio, the air-fuel ratio enrichment amount is an amount by which the target air-fuel ratio is changed with respect to the stoichiometric air-fuel ratio, the air-fuel ratio enrichment amount is determined based on the learned imbalance value, the learned imbalance value is an estimated imbalance ratio, and the estimated imbalance ratio is a parameter related to a degree of an inter-cylinder air-fuel ratio variation.

2. The air-fuel ratio imbalance determination apparatus according to claim 1, wherein the control unit is configured to execute the air-fuel ratio enrichment control in a case where the control unit determines that the air-fuel ratio imbalance state occurs.

3. The air-fuel ratio imbalance determination apparatus according to claim 1, further comprising an oxygen sensor that is disposed downstream of the air-fuel ratio sensor with respect to an exhaust gas flow, wherein the control unit is configured to execute an air-fuel ratio sub feedback control based on an output of the oxygen sensor, and to execute the air-fuel ratio sub feedback control in a case where the output of the oxygen sensor is a lean output during the execution of the air-fuel ratio enrichment control.

4. The air-fuel ratio imbalance determination apparatus according to claim 3, wherein the control unit is configured to execute air-fuel ratio sub feedback learning for learning a correction amount of the air-fuel ratio sub feedback control in the case where the output of the oxygen sensor is the lean output during the execution of the air-fuel ratio enrichment control.

5. An air-fuel ratio imbalance determination method for a multi-cylinder internal combustion engine including an air-fuel ratio sensor with a catalyst layer disposed in an exhaust passage of the multi-cylinder internal combustion engine, wherein determination regarding an air-fuel ratio imbalance state among cylinders of the multi-cylinder internal combustion engine is performed based on an amount of change per unit time in an air-fuel ratio detected by the air-fuel ratio sensor, and an air-fuel ratio enrichment control is executed using an air-fuel ratio enrichment amount, the air-fuel ratio imbalance determination method comprising:

determining whether an engine operation state is in an imbalance learning range during execution of the air-fuel ratio enrichment control;

determining whether the air-fuel ratio enrichment amount is smaller than a predetermined determination threshold value in a case where it is determined that the engine operation state is in the imbalance learning range; and correcting a learned imbalance value to be increased in a case where it is determined that the air-fuel ratio enrichment amount is smaller than the predetermined determination threshold value;

wherein the air-fuel ratio enrichment control is a control for setting a target air-fuel ratio to a value richer than a stoichiometric air-fuel ratio, the air-fuel ratio enrichment amount is an amount by which the target air-fuel ratio is changed with respect to the stoichiometric air-fuel ratio, the air-fuel ratio enrichment amount is determined based on the learned imbalance value, the learned imbalance value is an estimated imbalance ratio, and the estimated imbalance ratio is a parameter related to a degree of an inter-cylinder air-fuel ratio variation.

6. The air-fuel ratio imbalance determination method according to claim 5, wherein the air-fuel ratio enrichment control is executed in a case where the control unit determines that the air-fuel ratio imbalance state occurs.

* * * * *

UNITED STATES PATENT AND TRADEMARK OFFICE

CERTIFICATE OF CORRECTION

PATENT NO. : 9,279,377 B2
APPLICATION NO. : 13/754227
DATED : March 8, 2016
INVENTOR(S) : Takeshi Genko It is certified that error appears in the above-identified patent and that said Letters Patent is hereby corrected as shown below:

Specification

In column 6, Line 4, after "is richer than the", delete "stoichiometric ratio" and insert --stoichiometric air-fuel ratio-- therefor.

Signed and Sealed this
Seventeenth Day of May, 2016

Michelle K. Lee
*Director of the United States Patent and Trademark Office*